No. 737,123. PATENTED AUG. 25, 1903.
F. J. MACHALSKE.
PROCESS OF PRODUCING CHLORIDS OF CARBON.
APPLICATION FILED SEPT. 24, 1902.
NO MODEL.
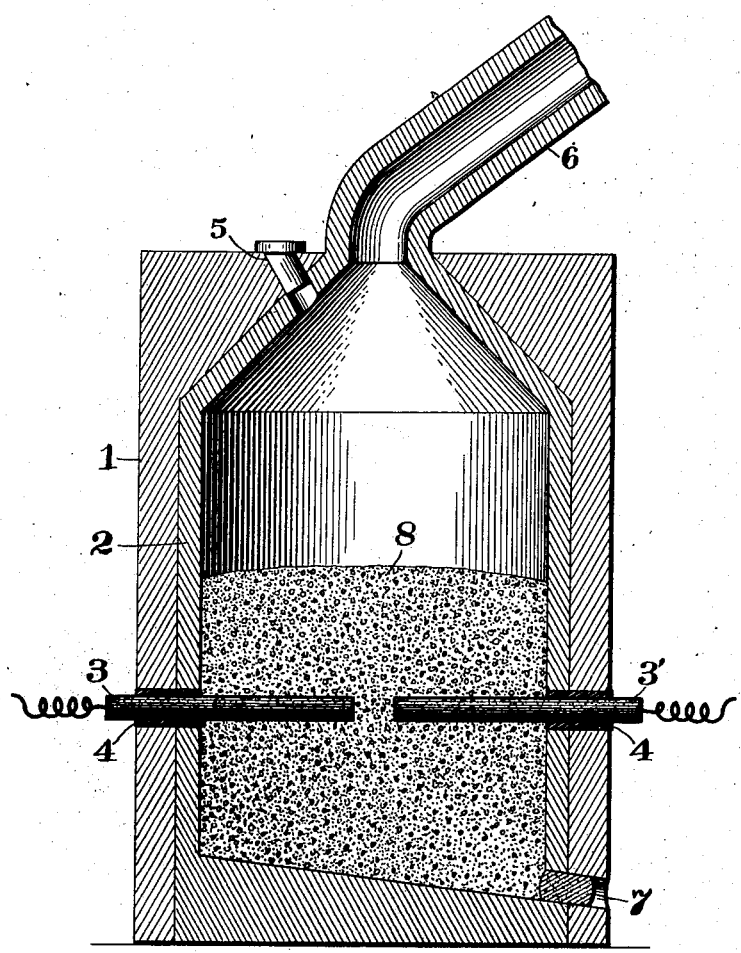
Witnesses:
R A Balderson
J. B. Hill
Inventor
Florentine Joseph Machalske,
by Byrnes & Townsend,
Att'ys.

UNITED STATES PATENT OFFICE.

FLORENTINE JOSEPH MACHALSKE, OF CHICAGO, ILLINOIS, ASSIGNOR OF ONE-HALF TO CHARLES HERBERT LYON, OF CHICAGO, ILLINOIS.

PROCESS OF PRODUCING CHLORIDS OF CARBON.

SPECIFICATION forming part of Letters Patent No. 737,123, dated August 25, 1903.

Application filed September 24, 1902. Serial No. 124,653. (No specimens.)

*To all whom it may concern:*

Be it known that I, FLORENTINE JOSEPH MACHALSKE, a citizen of the United States, and a resident of the city of Chicago, State of Illinois, have invented a new and useful Process of Producing Chlorids of Carbon, of which the following is a full, clear, and exact description.

According to this process a mixture of carbonaceous substance, a chlorin compound, and an agent which will combine with the base of the chlorin compound is heated to a high temperature, preferably by means of an electric furnace. The chlorin liberated from its compound combines with the heated carbon, and the resulting carbon chlorid is withdrawn and may be condensed. The preferred charge consists of a mixture of broken coke, sodium chlorid, and silica sand. The charge should be free from water, and a non-oxidizing atmosphere is maintained in the furnace. Various chlorids of carbon may be produced by varying the proportions of the ingredients of the charge.

A suitable furnace for carrying out the process is shown in the accompanying drawing, in which the figure is a vertical axial section. It is to be understood that this furnace is merely illustrative and that the process is in no way limited to its use.

The furnace shown comprises a stack 1 of refractory non-conducting material, such as fire-brick, with a lining 2 of magnesia brick. Carbon electrodes 3 3' pass adjustably through refractory non-conducting sleeves in the sides of the furnace. A charging-opening 5, with suitable closure, extends through the top wall. An outlet-flue 6 for the carbon chlorids rises from the upper end of the furnace. A tap-hole 7 leads from the lower part of the furnace-chamber.

According to the preferred mode of operation a charge 8, consisting of a water-free mixture of broken coke, sodium chlorid, and pure silica sand is introduced into the furnace, so as to surround the ends of the electrodes. An electric current is then passed between the electrodes and through the charge, heating the mixture to a temperature sufficient to effect the reaction. It is probable that the high temperature first melts the sodium chlorid and that the silica then reacts with the molten chlorid to liberate chlorin, which thereupon combines with the incandescent coke to produce the carbon chlorid. The resulting chlorid is delivered through the outlet-flue 6 to a condenser or chamber, and the molten residue is withdrawn through the tap-hole. Air should be excluded from the furnace during the operation.

Various chlorids of carbon may be produced by varying the proportions of the ingredients of the charge. Typical reactions may be represented by the following equations:

(1.) 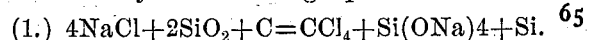
$4NaCl + 2SiO_2 + C = CCl_4 + Si(ONa)4 + Si.$ (2.) 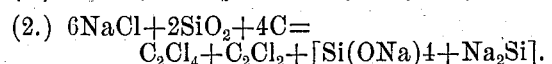
$6NaCl + 2SiO_2 + 4C = C_2Cl_4 + C_2Cl_2 + [Si(ONa)4 + Na_2Si].$ (3.) 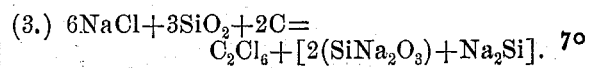
$6NaCl + 3SiO_2 + 2C = C_2Cl_6 + [2(SiNa_2O_3) + Na_2Si].$ Sulfur chlorid may be produced simultaneously with the carbon chlorids by adding sulfur to the charge. A typical reaction in this case may be represented by the following equation:

(4.) 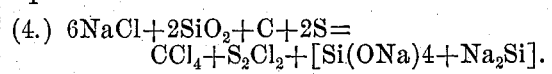
$6NaCl + 2SiO_2 + C + 2S = CCl_4 + S_2Cl_2 + [Si(ONa)4 + Na_2Si].$ It will be seen from these reactions that the silica serves to bind the base of the chlorin compound.

It will be noted that the charge employed for the production of chlorids of carbon entirely differs from that used for the production of silicon carbid, in which a small amount of sodium chlorid is usually added to the mixture of carbon and silica to serve as a flux and render the mass porous. In this process the chlorin compound is used in much larger proportion, being a principal ingredient of the charge, as will be seen from the equations represesenting the reactions. The temperature requisite for this process is also lower than that necessary for the production of silicon carbid, being below 2,000° centigrade. An electric current of five hundred amperes at a potential difference of sixty volts is sufficient for a furnace of the usual size. The production of silicon carbid requires, according to Acheson, a temperature above 4,000° Fahrenheit, and, according to Moissan, a temperature sufficient to vaporize carbon and silica.

I claim—

1. The process of producing chlorids of carbon, which consists in heating a mixture of a carbonaceous substance, a chlorin compound and an agent which will combine with the base of the chlorin compound, to a temperature sufficient to effect the reaction, as set forth.

2. The process of producing chlorids of carbon, which consists in heating a mixture of a carbonaceous substance, a chlorin compound and silica to a temperature sufficient to effect the reaction, as set forth.

3. The process of producing chlorids of carbon, which consists in heating a mixture of carbon, an alkali chlorid and silica to a temperature sufficient to effect the reaction, as set forth.

4. The process of producing chlorids of carbon, which consists in heating a mixture of carbon, sodium chlorid and silica to a temperature sufficient to effect the reaction, as set forth.

5. The process of producing chlorids of carbon, which consists in heating a mixture of coke, sodium chlorid and silica sand to a temperature sufficient to effect the reaction, as set forth.

6. The process of producing chlorids of carbon, which consists in electrically heating a mixture of carbon, sodium chlorid and silica to a temperature sufficient to effect the reaction, as set forth.

7. The process of producing carbon tetrachlorid, which consists in heating a mixture of one part of coke, four parts of sodium chlorid and two parts of silica sand to a temperature sufficient to effect the reaction, as set forth.

8. The process of simultaneously producing chlorids of carbon and sulfur, which consists in heating a mixture of coke, sodium chlorid, silica and sulfur to a temperature sufficient to effect the reaction.

FLORENTINE JOSEPH MACHALSKE.

Witnesses:
EUGENE A. BYRNES,
C. W. JOHNSON.